United States Patent
Okubo et al.

(10) Patent No.: US 7,732,556 B2
(45) Date of Patent: Jun. 8, 2010

(54) PROCESS OF PRODUCING POLYESTERS

(75) Inventors: Kazuyuki Okubo, Mie (JP); Masanori Yamamoto, Mie (JP); Yoshio Akahane, Mie (JP); Toshiyuki Hamano, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 450 days.

(21) Appl. No.: 11/084,112

(22) Filed: Mar. 21, 2005

(65) Prior Publication Data

US 2005/0239999 A1 Oct. 27, 2005

Related U.S. Application Data

(63) Continuation of application No. PCT/JP03/10170, filed on Aug. 8, 2003.

(30) Foreign Application Priority Data

Sep. 20, 2002 (JP) ............... 2002-275916
Nov. 8, 2002 (JP) ............... 2002-325705

(51) Int. Cl.
 *C08G 63/02* (2006.01)
(52) U.S. Cl. .................. 528/272; 528/308.1; 528/308.3
(58) Field of Classification Search ................ 528/200, 528/272, 308.1, 308.3
See application file for complete search history.

(56) References Cited

U.S. PATENT DOCUMENTS 6,380,345 B1 * 4/2002 Uenishi et al. .............. 528/200

2002/0161166 A1 * 10/2002 Nakane et al. .............. 528/272

FOREIGN PATENT DOCUMENTS

JP 57-135828 8/1982
JP 5-214089 8/1993

OTHER PUBLICATIONS

Korting Website Steam Jet Vacuum Injectors; www.koerting.de/products/vacuum_technology/steam_jet_vacuum_ejectors/.*

* cited by examiner

*Primary Examiner*—James Seidleck
*Assistant Examiner*—Gregory Listvoyb
(74) *Attorney, Agent, or Firm*—Oblon, Spivak, McClelland, Maier & Neustadt, L.L.P.

(57) ABSTRACT

A problem of the invention is to provide a process of producing polyesters having a stable quality and a process of producing polyesters with a greatly reduced load against the environment.

The invention relates to a process of producing polyesters by using a polycondensation reaction apparatus provided with one or more sets of an ejector, a condenser placed in the downstream portion of the ejector and a hot well tank connected to the condenser via a barometric leg and including a step of driving the ejector by a vapor composed mainly of 1,4-butanediol, condensing the vapor composed mainly of 1,4-butanediol as discharged from the ejector in the condenser placed in the downstream portion of the ejector, and making the reactor in a reduced pressure state to undergo polycondensation reaction, characterized in that the concentration of tetrahydrofuran contained in a sealing liquid in at least one hot well tank is not more than 4% by weight.

20 Claims, 6 Drawing Sheets

PROCESS OF PRODUCING POLYESTERS

TECHNICAL FIELD

The present invention relates to a process of producing polyesters. In more detail, the invention relates to a process capable of realizing a stable vacuum reaction and producing polyesters having a stable quality.

BACKGROUND ART

Polyesters are used in various fields including fibers, molded parts, and films because they are excellent in easiness of molding processing, mechanical properties, heat resistance, chemical resistance, flavor retention, and other physical or chemical characteristics.

Above all, polybutylene terephthalate comprising a terephthalic acid component and a 1,4-butanediol component is widely used in injection molded articles such as automotive parts, electric or electronic parts, and precision machine parts as one of engineering plastics having mechanical properties and heat resistance, which can be a substitute for metallic materials, and in recent years, has also been widely used in fields including films, sheets, monofilaments, and fibers because of its excellent properties.

In general, polyesters are prepared by esterification reaction or ester exchange reaction between a dicarboxylic acid or an ester derivative thereof and a diol and subsequent polycondensation reaction usually under a reduced pressure of 10 kPa or less while removing formed water and low-molecular weight materials such as diols out the system.

At this time, for the sake of reducing the pressure of a polycondensation reaction vessel, a deaerator is necessary, and for example, various types such as liquid ring pumps, oil rotary pumps, Roots pumps, and steam ejectors are known. A method of designing to maximize the performance by combining a plurality of them is frequently carried out.

Above all, a combination of a steam ejector, a condenser placed in the downstream portion of the ejector, and a hot well tank connected to the condenser via a barometric leg is widely used because the apparatus is simple, mechanical driving portions that are liable to cause troubles are not provided, and a desired high degree of vacuum is obtained (for example, see Patent Document 1).

However, the steam ejector utilizing steam involved a problem such that organic components contained in a sucked gas are collected in the condenser and condensed in sealing water in the hot well tank and in its terns introduce an increase of COD of waste water, whereby a load against the environment increases.

For solving this problem, there is also known a method in which in polyesters such as polyethylene terephthalate, a combination of an ejector using a vapor of a starting material diol (ethylene glycol in the case of polyethylene terephthalate) in place of steam, a condenser placed in the downstream portion of the ejector, and a hot well tank connected to the condenser via a barometric leg is used. By using this method, organic components contained in a sucked gas can be condensed in the diol as a sealing liquid of the condenser, and by recycling this liquid as the starting material, polyesters can be prepared without discharging a waste liquid with high COD outside the system (for example, see Non-Patent Document 1).

On the other hand, in the case of using 1,4-butanediol as a driving vapor of the ejector, there was involved a problem such that tetrahydrofuran (THF) or $H_2O$ is generated according to heat history of the vapor generation of the ejector; and in a plurality of condensers having a different performance as placed in the downstream portion of the ejector, gas-liquid distribution takes place corresponding to pressures of the respective condensers, and THF, $H_2O$ or the like condensed in the condenser having a high pressure increases a vapor pressure of THF, $H_2O$ or the like in the condenser having a low pressure via the hot well tank and ultimately exceeds a critical backing pressure of the ejector using the condenser having a low pressure, whereby a prescribed pressure is not obtained.

Also, from the viewpoint of recycling into the starting material, in many cases, in the case of preparing polyesters using 1,4-butanediol as one monomer component, an ejector using 1,4-butadiol as a driving vapor is used. In this case, there was also involved a problem such that similar to the foregoing, low-boiling components formed from the polycondensation reaction vessel, such as THF and water, increase the vapor pressure of the sealing liquid of the hot well tank and ultimately exceeds a critical backing pressure of the ejector, whereby a prescribed pressure is not obtained.

[Patent Document 1]
JP-A-57-135828
[Non-Patent Document 1]
Internet
http://www.koerting.de/S/prd/en/02/06/01.html The invention has been made for the purpose of providing a process capable of realizing a stable reduced pressure state and producing polyesters having a stable quality.

DISCLOSURE OF THE INVENTION

For the sake of solving the foregoing problems, the present inventors made extensive and intensive investigations. As a result, it has been found that by setting a tetrahydrofuran concentration in a sealing liquid of a hot well tank of a condenser placed in the downstream portion of an ejector for condensing a gas discharged from the ejector that is driven by a 1,4-butanediol vapor at a specific value or less, a stable reduced pressure state can be realized, and polyesters having a stable quality can be obtained, leading to accomplishment of the invention.

Specifically, the gist of the invention is to provide a process of producing polyesters by using a polycondensation reaction apparatus having one or more polycondensation reaction vessels provided with one or more sets of an ejector, a condenser placed in the downstream portion of the ejector and a barometric leg, and one or more hot well tanks connected to the condenser via the barometric leg and including a step of driving the ejector by a vapor composed mainly of 1,4-butanediol, condensing the vapor composed mainly of 1,4-butanediol as discharged from the ejector in the condenser placed in the downstream portion of the ejector, and making the reactor in a reduced pressure state to undergo polycondensation reaction, characterized in that the concentration of tetrahydrofuran contained in a sealing liquid in at least one hot well tank is not more than 4% by weight and to solve the defects of the foregoing conventional technologies.

Figure 1:
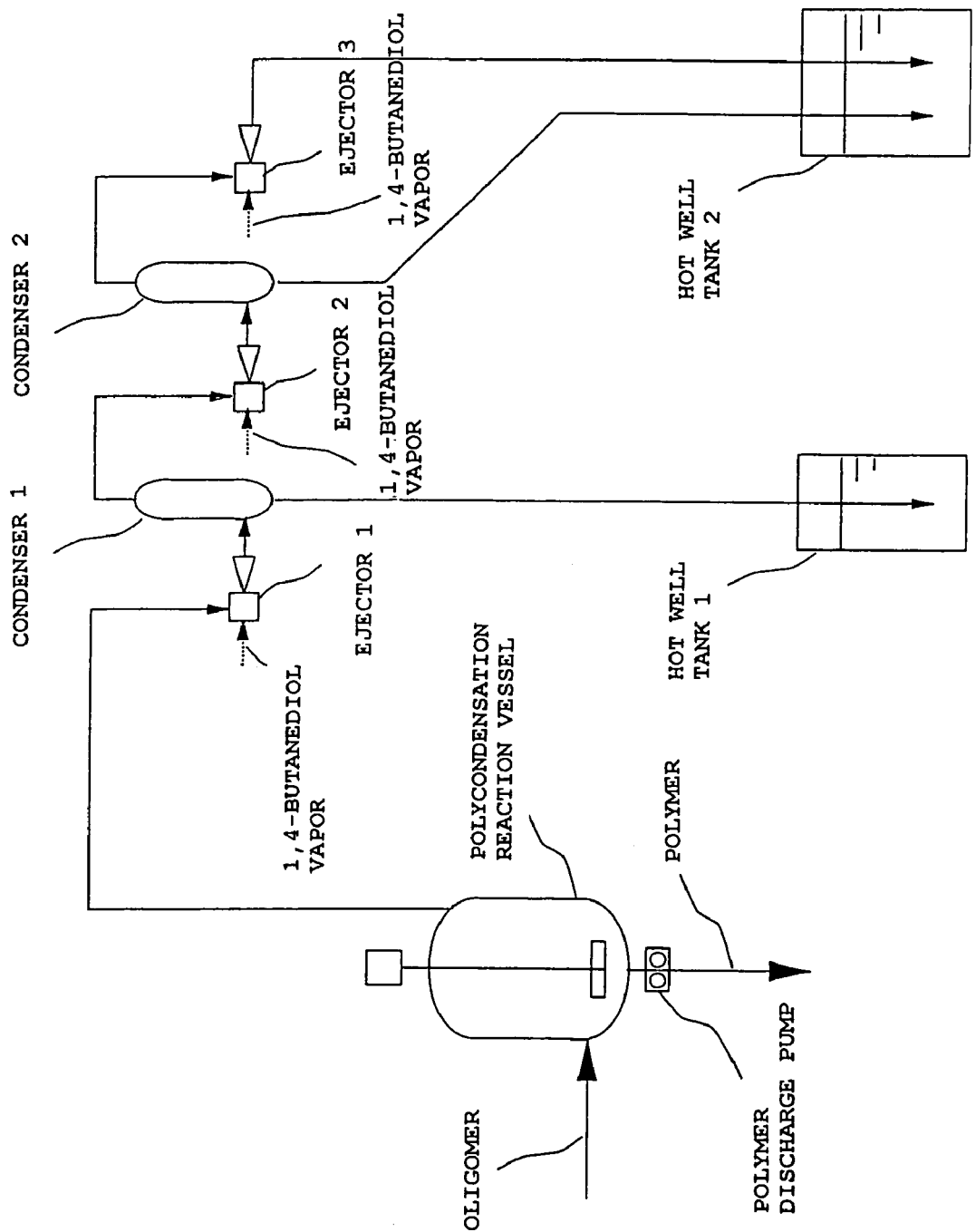
FIG. 1 is a conceptional view of one specific embodiment of a polycondensation reaction apparatus to be used in the production process of the invention, in which one polycondensation reaction vessel is provided.

Incidentally, reference numerals and signs in the drawings are as follows.

a: First polycondensation reaction vessel provided with stirrer
b: Gear pump
c: Condenser of collecting a gas distilled from first polycondensation reaction vessel a
d: Tank of liquid collected in wet condenser c
e: Pump
f: Heat exchanger
g: Horizontal second polycondensation reaction vessel
h: Gear pump
i: Wet condenser of collecting a gas distilled from second polycondensation reaction vessel
j: Tank of collected liquid
k: Pump
m: Die for discharging polymer
n: Chip cutter
p: Heat exchanger
1: Feed line into first polycondensation reaction vessel a
2: Feed line from first polycondensation reaction vessel a into second polycondensation reaction vessel g
3: Vent line from first polycondensation reaction vessel a
4: Liquid discharge line from wet condenser c
5: Circulation line from tank d into wet condenser c
6: Discharge line of condensate into the outside
7: Feed line of 1,4-butanediol into tank d
8: Gas discharge line into ejector A
9: Polymer discharge line from second polycondensation reaction vessel g
10: Vent line from second polycondensation reaction vessel g
11: Liquid discharge line from wet condenser i
12: Circulation line from tank j into wet condenser i
13: Discharge line of condensate into the outside
14: Feed line of 1,4-butanediol into tank
15: Gas discharge line into ejector G
A, B, G, H, J: Ejector
C, D, K, L, M: Barometric condenser
E, N: Condenser
F, P: Vacuum pump
Q, R, S: Hot well tank
U: Buffer tank
W: Distillation separation column of THF and H$_2$O
X: Reboiler of distillation separation column W
T, V, Y: Pump
Z: Boiler for generation of 1,4-butanediol vapor for ejector
16, 17, 26, 27, 28: Discharge line of gas from barometric condenser
18, 29: Line from heat exchanger into vacuum pump
19, 30: Ejection gas line from vacuum pump
20, 21, 31, 32, 33: Feed line of 1,4-butanediol
22, 23, 34, 35, 36: Feed line of 1,4-butanediol vapor into ejector
24, 25, 37, 38, 39: Barometric leg of barometric condenser
40: Discharge line from hot well tank
41: Line from pump T into buffer tank U
42: Discharge line from buffer tank U
43: Line from pump V into distillation separation column
44: Expelling line
45: Discharge line of 1,4-butanediol
46: Discharge line of low-boiling components
47: Ejection line of pump Y
48: Feed line into hot well tanks Q, R and S
49: Circulation line from reboiler V
50: Feed line into external expelling tank, etc.
51: Feed line of 1,4-butanediol from outside
52: Line from pump V into boiler for generation of 1,4-butanediol vapor
53: Line from hot well tank S into hot well tank Q
54: Line from hot well tank Q into hot well tank R
55: Feed line of 1,4-butanediol from outside
56: Line from boiler Z into hot well line S
57: Line of 1,4-butanediol vapor from boiler Z into respective ejectors
58: Discharge line from hot well tank R into outside

BEST MODE FOR CARRYING OUT THE INVENTION

The invention will be hereunder described in detail.

The polyester as referred to in the invention is a high-molecular weight compound having a structure in which a dicarboxylic acid unit and a diol unit form an ester bond. Specific examples of dicarboxylic acids include aromatic dicarboxylic acids such as terephthalic acid, isophthalic acid, 4,4'-diphenyldicarboxylic acid, 4,4'-diphenyl ether dicarboxylic acid, 4,4'-benzophenonedicarboxylic acid, 4,4'-diphenoxyethanedicarboxylic acid, 4,4'-diphenylsulfonedicarboxylic acid, and 2,6-naphthalenedicarboxylic acid; alicyclic dicarboxylic acids such as 1,2-cyclohexanedicarboxylic acid, 1,3-cyclohexanedicarboxylic acid, and 1,4-cyclohexanedicarboxylic acid; and aliphatic dicarboxylic acids such as malonic acid, succinic acid, glutaric acid, adipic acid, pimelic acid, suberic acid, azelaic acid, and sebacic acid. Of the aromatic dicarboxylic acids, terephthalic acid and isophthalic acid are preferable, and of the aliphatic dicarboxylic acids, succinic acid and adipic acid are preferable from the viewpoints of mechanical properties, broad utility, easiness of availability of starting materials, etc.

These dicarboxylic acid components can be provided for the reaction as a dicarboxylic acid or an alkyl ester, preferably dialkyl ester of a dicarboxylic acid, and a mixture of a dicarboxylic acid and a dicarboxylic acid alkyl ester may also be used. The alkyl group of the dicarboxylic acid alkyl ester is not particularly limited. However, when the alkyl group is long, an increase of the boiling point of an alkyl alcohol formed during the ester exchange reaction is caused so that the alkyl alcohol does not volatilize from the reaction solution and as a result, works as a terminal stopper to hinder the polymerization. Accordingly, alkyl groups having not more than 4 carbon atoms are preferable, with a methyl group being especially suitable.

Specific examples of the diol component include aliphatic diols such as ethylene glycol, diethylene glycol, polyethylene glycol, 1,2-propanediol, 1,3-propanediol, polypropylene glycol, 1,4-butanediol, polytetramethylene glycol, dibutylene glycol, 1,5-pentanediol, neopentyl glycol, 1,6-hexanediol, and 1,8-octanediol; alicyclic diols such as 1,2-cyclohexanediol, 1,4-cyclohexanediol, 1,1-cyclohexanedimethylol, and 1,4-cyclohexanedimethylol; and aromatic diols such as xylylene glycol, 4,4'-dihydroxybiphenyl, 2,2-bis(4-hydroxyphenyl)propane, and bis(4-hydroxyphenyl)sulfone. Especially, the improving effect of the invention is remarkable in polyesters in which 50% by mole or more of the diol unit is 1,4-butanediol.

In the invention, it is possible to further use a monofunctional component such as a hydroxycarboxylic acid such as lactic acid, glycolic acid, m-hydroxybenzoic acid, p-hydroxybenzoic acid, 6-hydroxy-2-naphthalenecarboxylic acid, p-β-hydroxyethoxybenzoic acid, an alkoxycarboxylic acid, stearyl alcohol, benzyl alcohol, stearic acid, benzoic acid, t-butylbenzoic acid, and benzoylbenzoic acid; or a trifunctional or polyfunctional component such as tricarballylic acid, trimellitic acid, trimesic acid, pyromellitic acid, gallic acid, trimethylolethane, trimethylolpropane, glycerol, and pentaerythritol as a copolymerization component.

Especially, in polybutylene terephthalate comprising a dicarboxylic acid unit comprising 70% by mole or more, preferably 80% by mole or more, and especially preferably 95% by mole or more of a terephthalic acid unit and a diol unit comprising 70% by mole or more, preferably 80% by mole or more, and especially preferably 95% by mole or more of a 1,4-butanediol unit, the improving effect of the invention is large because the amount of THF generated during the reaction is high.

The production process of polyesters of the invention will be hereunder described while referring to polybutylene terephthalate as an example.

The production process of polybutylene terephthalate is roughly classified into a so-called direct polymerization method of using terephthalic acid as a main starting material and an ester exchange method of using a terephthalic acid dialkyl ester, and preferably dimethyl terephthalate as a main starting material. Though there is a difference between the both methods such that in the former, water is mainly formed during the initial esterification reaction, and in the latter, an alcohol is mainly formed during the initial ester exchange reaction, the direct polymerization method is preferable from the viewpoints of easiness of treatment of the reaction distillate, high unit consumption of the starting materials and the improving effect by the invention. Also, a so-called continuous method of continuously feeding the starting materials and continuously obtaining polybutylene terephthalate is preferable from the viewpoints of stabilization of quality and energy efficiency.

As one example of the direct polymerization method, the foregoing dicarboxylic acid component containing terephthalic acid as the major component and the foregoing diol component containing 1,4-butanediol as the major component are subjected to esterification in a single-stage or multi-stage esterification reaction vessel preferably in the presence of an esterification reaction catalyst at a temperature of usually from 180 to 260° C., preferably from 200 to 245° C., and especially preferably from 210 to 235° C. under a pressure of usually from 10 to 133 kPa, preferably from 13 to 101 kPa, and especially preferably from 60 to 90 kPa for from 0.5 to 5 hours, and preferably from 1 to 3 hours. The reaction may be any of a batch method and a continuous method but is especially preferably a continuous method.

On the other hand, as one example of the ester exchange method, the foregoing dicarboxylic acid ester component containing a dialkyl ester of terephthalic acid as the major component and the foregoing diol component containing 1,4-butanediol as the major component are subjected to ester exchange reaction in a single-stage or multi-stage ester exchange reaction vessel preferably in the presence of an ester exchange reaction catalyst at a temperature of usually from 110 to 260° C., preferably from 140 to 245° C., and especially preferably from 180 to 220° C. under a pressure of usually from 10 to 133 kPa, preferably from 13 to 120 kPa, and especially preferably from 60 to 101 kPa for from 0.5 to 5 hours, and preferably from 1 to 3 hours. The reaction may be any of a batch method and a continuous method but is especially preferably a continuous method.

In any case of the foregoing direct polymerization method and ester exchange method, in the initial esterification reaction or ester exchange reaction, the distillation amount of 1,4-butanediol, THF, water, alcohols, etc. is high. Accordingly, it is preferable to provide a distillation column for separating low-boiling substances and high-boiling substances from the distillate, as disclosed in JP-A-62-195017, etc.

Next, the resulting oligomer as an esterification reaction product or ester exchange reaction product is transferred into a polycondensation reaction apparatus. At this time, the number average molecular weight of the oligomer is usually from 300 to 3,000, and preferably from 500 to 1,500. In the polycondensation reaction apparatus, the polycondensation reaction is carried out with stirring in the presence of a polycondensation reaction catalyst at a temperature of usually from 210 to 280° C., preferably from 220 to 265° C., and especially preferably from 230 to 245° C. for from 1 to 12 hours, and preferably from 3 to 10 hours under a reduced pressure of usually not more than 27 kPa, preferably not more than 20 kPa, and especially preferably not more than 13 kPa using a single-stage or multi-stage polycondensation reaction vessel. The reaction may be any of a batch method and a continuous method but is especially preferably a continuous method.

In the production process of the invention, there is used the polycondensation reaction apparatus provided with, as a deaerator to be used for making the inside of the polycondensation reaction vessel in a reduced pressure state, a device of driving an ejector with a vapor mainly containing the 1,4-butanediol component and condensing a vapor mainly containing 1,4-butanediol discharged from the ejector in a condenser placed in the downstream portion of the ejector to make the polycondensation reaction vessel in a reduced pressure state.

In the following, the condenser means a condenser in the downstream portion of the ejector, unless otherwise indicated, and the condenser placed in the downstream portion of the ejector includes all of condensers positioned in the downstream portion of the ejector closest to the polycondensation reaction vessel.

Examples of the condenser to be used in the invention include surface types and direct contact types such as a barometric condenser. Above all, direct contact types that do not require excessive equipment and hardly cause clogging with the entrained oligomer components, additive components, etc. are preferable.

The sealing liquid of the hot well tank connected to the condenser via a barometric leg contains 1,4-butanediol as the major component but also contains THF, $H_2O$, alcohols, etc. distilled from the vapor generator and polycondensation reaction vessel. It is not ease to control the vapor pressure of the sealing liquid of the hot well tank because it varies depending upon the contents of $H_2O$, alcohols, and other components and is influenced by the condition, production amount, etc. of the polycondensation reaction and the like. However, in the invention, from the standpoint of capacity stability of the ejector, it is necessary that the concentration of THF in the sealing liquid in at least one hot well tank be not more than 4% by weight, preferably not more than 3% by weight, and especially not more than 1.5% by weight. In particular, in the case where the pressure of the condenser or the critical backing pressure of the ejector is not more than 3 kPa, the concentration of THF is suitably not more than 1% by weight. When the tetrahydrofuran concentration in the sealing liquid is all more than 4% by weight, a degree of vacuum necessary for the polyester production is not stably obtained, and hence, such is inconvenient.

As the method of controlling the THF concentration of the sealing liquid of at least one hot well tank at not more than 4% by weight, there is enumerated a method in which the hot well tanks attached to the condenser having a low pressure and the condenser having a high pressure are separated into two or more series, and at least the THF concentration of the sealing liquid of the hot well tank attached to the condenser having the lowest pressure is kept at not more than 4% by weight.

Also, from the viewpoint of flexibility of the operation, it is possible to discharge the sealing liquid of the hot well tank within the range where the THF concentration of the sealing liquid of at least one hot well tank does not exceed 4% by weight and to feed a part or the whole of the liquid into a boiler for generation of the 1,4-butanediol vapor to be used in the ejector. Especially, it is preferable to apply the sealing liquid of the hot well tank having the lowest THF concentration thereto. When the feed amount is high, there bring about advantages that the amount of 1,4-butanediol to be recycled in a system of the boiler for generation of the 1,4-butanediol vapor, the ejector, the condenser, and the hot well tank is high so that the consumption amount of 1,4-butanediol can be reduced and that flexibility of the operation can be ensured. On the other hand, the THF concentration in the hot well tank increases so that the stable reduced pressure state cannot be kept, or high-boiling substances such as oligomers entrained with the gas from the polycondensation reaction vessel are liable to accumulate. Accordingly, the feed amount is usually not more than 50% by weight, preferably not more than 30% by weight, and especially preferably not more than 20% by weight of 1,4-butanediol to be used in the boiler for generation of the 1,4-butanediol vapor.

Further, examples of other methods of controlling the THF concentration of the sealing liquid of at least one hot well tank at not more than 4% by weight include a method of feeding 1,4-butanediol having a low THF content, usually not more than 2% by weight, preferably not more than 1% by weight, more preferably not more than 0.5% by weight, and especially preferably not more than 0.1% by weight into the hot well tank and a method of adjusting the temperature of the hot well tank and collecting and recovering the generated THF vapor in another condenser. The 1,4-butanediol having a low THF content can be fed directly into the hot well tank, or a condensate of the 1,4-butanediol vapor from the ejector can be employed.

Above all, from the viewpoint of easiness of control, a method in which 1,4-butanediol having a low THF content is fed directly into the hot well tank individually from the condensate of the 1,4-butanediol vapor from the ejector is preferable. Especially, a method in which a liquid having a high THF concentration corresponding to 1,4-butanediol having a low THF content as fed is discharged from the hot well tank, and the discharged liquid is fed into a starting material preparation vessel or an esterification reaction vessel or ester exchange vessel having THF separation equipment, thereby recycling the liquid having a high THF content is preferable.

However, in this case, when the feed amount of 1,4-butanediol having a low THF content into the hot well tank is too high, since the amount of the sealing liquid to be discharged becomes high corresponding thereto, in the case where the discharged sealing liquid is recycled into the starting material preparation system, the amount of 1,4-butanediol in the discharged sealing liquid exceeds that used in the starting material, thereby possibly hindering the stable operation.

Also, in the case where the discharged sealing liquid is fed into the esterification reaction vessel or ester exchange reaction vessel having THF separation equipment, as the feed amount increases, a load of the separation column increases or the temperature adjustment of the polycondensation reaction vessel becomes difficult, resulting in some possibility of hindering the stable operation.

As the method of avoiding such a situation, it is preferable to feed a part or the whole of the sealing liquid having a high THF concentration as discharged from the hot well tank into the THF separation treatment system and to separate THF from 1,4-butanediol. Also, components other than THF can be separated simultaneously or sequentially.

If desired, it is possible to return and use 1,4-butanediol from which THF has been separated into the hot well tank, the condenser, the condenser attached to the polycondensation reaction vessel, the starting material preparation system, the reaction system, and the like. Above all, it is preferable to return a part or the whole of 1,4-butanediol from which THF has been separated into the hot well tank.

For the separation of THF, known methods such as distillation, stripping, adsorption separation, membrane separation, and extraction can be employed, and distillation is preferable from the standpoints of separation efficiency, separation precision, simplicity of equipment, and the like.

In addition, not only the THF concentration in the sealing liquid of at least one hot well tank be not more than 4% by weight, but also the $H_2O$ concentration in the sealing liquid in the subject hot well tank is preferably not more than 3% by weight, more preferably not more than 2% by weight, particularly preferably not more than 1% by weight, and most suitably not more than 0.5% by weight. As the method of lowering the concentration of water in the sealing liquid, a method similar to the foregoing method of making the THF concentration not more than 4% by weight can be used.

It is preferable that the polycondensation reaction apparatus to be used in the invention has one or more polycondensation reaction vessels each provided with two or more sets of (a) an ejector, (b) a condenser placed in the downstream portion of the ejector, and (c) a barometric leg and has (d) two or more hot well tanks each connected to the condenser via a barometric leg.

Also, it is preferable that the polycondensation reaction apparatus has two or more polycondensation reaction vessels each provided with one or more sets of (a) an ejector, (b) a condenser placed in the downstream portion of the ejector, and (c) a barometric leg and has (d) two or more hot well tanks.

The polycondensation reaction apparatus to be used in the invention may be any of equipment configuration so far as the foregoing conditions are met, and as a whole, the total number of each of (a), (b), (c) and (d) may be different from each other.

As a further preferred apparatus, the polycondensation reaction apparatus has two or more polycondensation reaction vessels provided with two or more sets of (a) an ejector, (b) a condenser placed in the downstream portion of the ejector, and (c) a barometric leg.

Accordingly, the polycondensation apparatus comprises four or more of the ejector (a), four or more of the condenser (b), four or more of the barometric leg (c), and two or more of the hot well tank (d) as a whole. By such a configuration, it is possible to more stably control the degree of vacuum properly for each polycondensation reaction vessel in the polyester production.

In the polycondensation reaction apparatus to be used in the invention, the polycondensation reaction vessel may be of a single-stage system or a multi-stage system, preferably from a 2-stage to 5-stage system, and more preferably from a 2-stage to 3-stage system. For the sake of condensing or absorbing a gas generated in the polycondensation reaction vessel, it is preferable to provide a condenser between the polycondensation reaction vessel and the ejector (the upstream portion of the ejector) individually from the condenser in the downstream portion of the ejector, and examples include known types such as surface types and direct contact types. Above all, direct contact types having a good heat exchange efficiency and hardly causing clogging with sublimates are suitable. It is possible to provide a plurality of condensers in the upstream portion of the ejector attached to the polycondensation reaction vessel. When a plurality of condensers having a different temperature, and preferably ones in which the setting temperature decreases toward the downstream side are provided in series, it is possible to reduce an extraction load to the ejector.

Some preferred specific embodiments will be hereunder described.

(Specific Embodiment of the Case where the Polycondensation Reaction Vessel is of a Single-stage System)

In the case where the number of ejectors is two, each ejector is provided with one or more condensers; and in the case where the number of ejectors is three or more, at least two of the ejectors are provided with a condenser.

The condenser is provided with a hot well tank via a barometric leg, and the total number of hot well tanks is one or more, and preferably two or more. Accordingly, in the case where the number of condensers is two, the number of hot well tanks is two, and the barometric legs of the two condensers are connected to the respective hot well tanks. Also, in the case where the number of condensers is three or more, the number of hot well tanks is generally in the range of from two to the number of condensers, and in the case where the number of hot well tanks is smaller than the number of condensers, some of the condenser barometric legs are connected to the same hot well tanks.

The ejectors may be disposed in series or in parallel to the polycondensation reaction vessel and for the sake of efficiently obtaining a high degree of vacuum, are preferably disposed in series. Also, the ejectors may be disposed in the number of (n x m) such that two sets or more (n sets) of them are disposed in parallel, and two or more (the number of m) of them are disposed in series in each set.

In the case where the ejectors are disposed in parallel to the polycondensation reaction vessel, it is preferable that each set is provided with two or more condensers and hot well tanks.

FIG. 1 shows a conceptional view of a polycondensation reaction apparatus provided with one polycondensation reaction vessel, three ejectors, two condensers in the downstream portion of each ejector, and two hot well tanks, the condensers in the downstream portion of each ejector being connected to the respective hot well tanks via a barometric leg.

(Specific Embodiment of the Case where the Polycondensation Reaction Vessel is of a Two-stage System)

In the case where the polycondensation reaction apparatus is provided with two polycondensation reaction vessels, at least one polycondensation reaction vessel is the same device as described above in "Specific embodiment of the case where the polycondensation reaction vessel is of a single-stage system".

More preferably, the two polycondensation reaction vessels are each provided with two or more ejectors and two or more condensers. Accordingly, the number of ejectors, condensers and condenser barometric legs is four or more, respectively. Also, the number of hot well tanks is generally in the range of from two to the number of condensers. In the case where the number of hot well tanks is smaller than the number of condensers, some of the condenser barometric legs are connected to the same hot well tanks.

(Specific Embodiment of the Case where the Polymerization Reaction Vessel is of a Three-stage or Multi-stage System)

The basic configuration of the polycondensation reaction apparatus is the same as described above in "Specific embodiment of the case where the polycondensation reaction vessel is of a single-stage system" and "Specific embodiment of the case where the polycondensation reaction vessel is of a two-stage system", but it is preferable that the total number of hot well tanks is respectively two or more, and it is possible to properly choose the configuration.

Preferably, each polymerization reaction vessel is provided with two or more ejectors and condensers, and three or more hot well tanks are provided in total.

In any case, in the case where the hot well tanks are partitioned by a structure in which sealing liquids are not mixed with each other, the respective hot well tanks are counted to be one. In general, in many cases, they are recognized as individual vessels in appearance. Needless to say, the case where even when the hot well tanks are seen to be one in appearance, they are internally partitioned is included.

In particular, in the case where the number of hot well tanks is less than the number of condensers, a plural number of condenser barometric legs will be inserted into one hot well tank. In this case, as a method of separating the hot well tanks, it is preferable to get together the condensers having a pressure closed to each other or the ejectors attached thereto having a critical backing pressure closed to each other and to insert those having a separated pressure or critical backing pressure into the different hot well tanks. Concretely, in the case where a difference in the pressure of the condensers or the critical backing pressure of the ejectors is 1 kPa or more, preferably 2 kPa or more, and especially preferably 3 kPa or more, it is recommended to insert condenser barometric legs into different hot well tanks.

Figure 2:
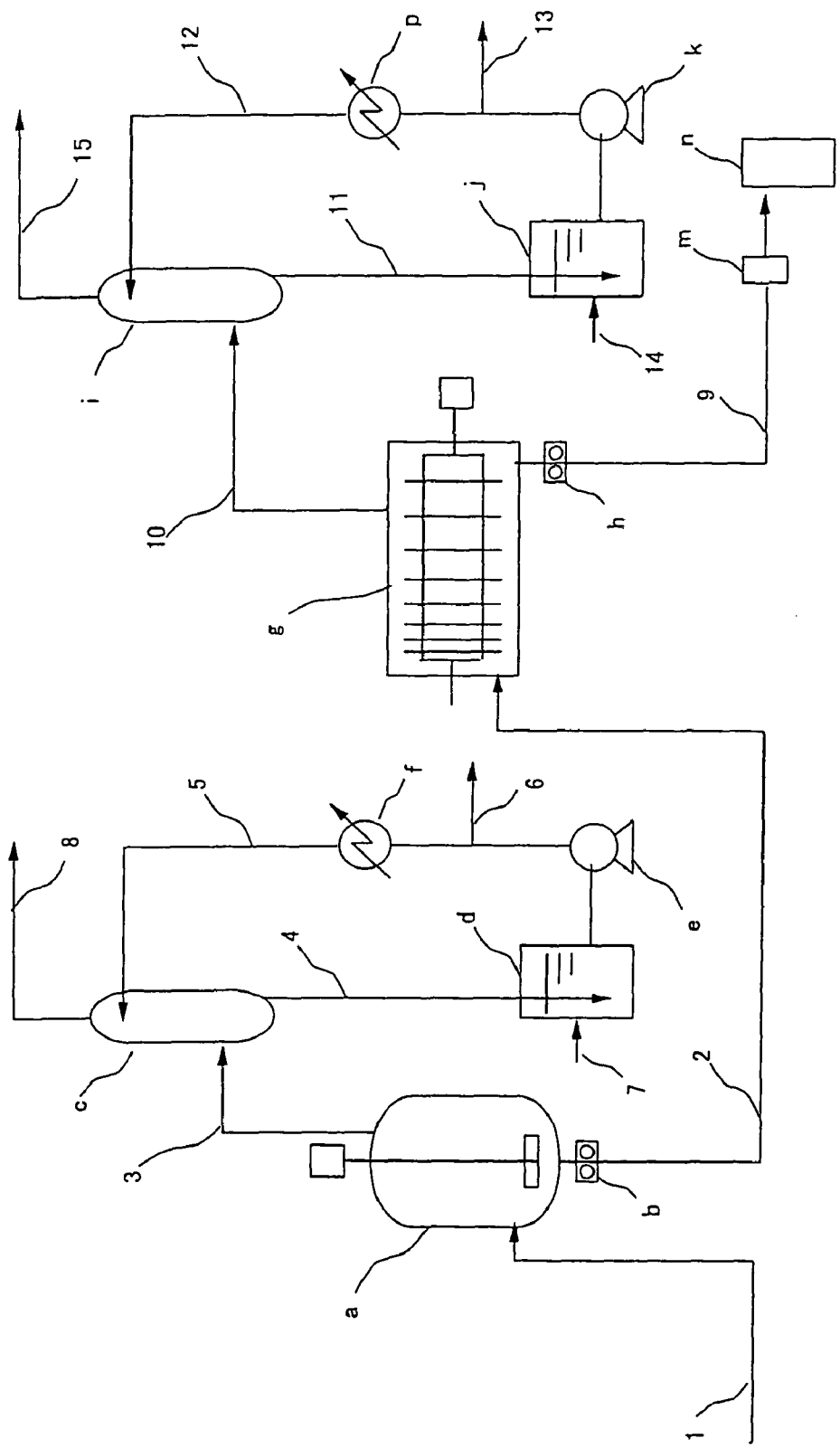
FIG. 2 is a conceptional view of one specific embodiment of a polycondensation reaction apparatus to be used in the production process of the invention, which is employed in Examples 1 to 3 and Comparative Example 1.
Figure 3:
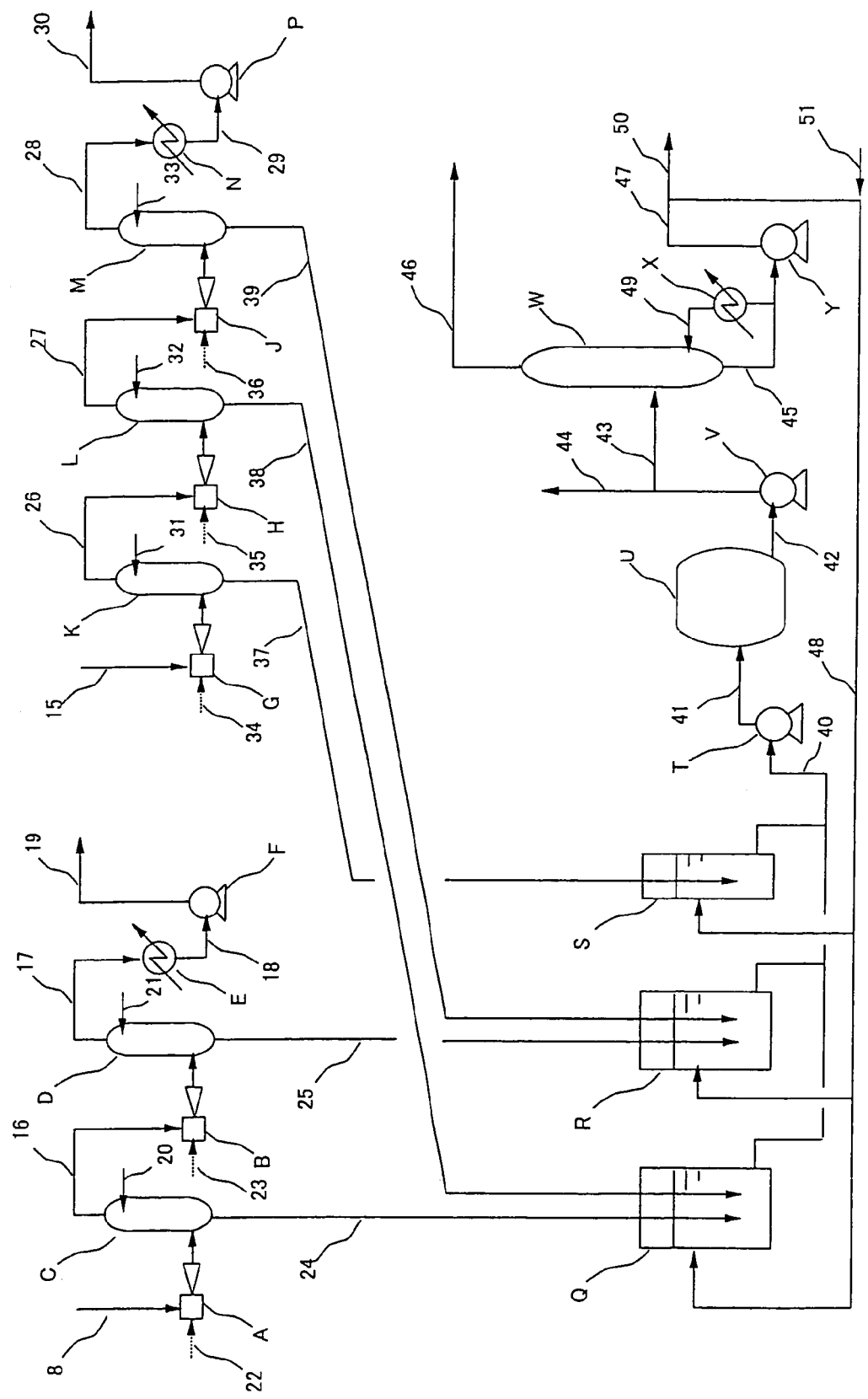
FIG. 3 is one conceptional view showing a deaeration system in detail in one specific embodiment of a polycondensation reaction apparatus to be used in the production process of the invention, which is employed in Examples 1 and 2.

Representative specific embodiments of the invention are shown in FIGS. 2 and 3.

In FIG. 2, a is a first polycondensation reaction vessel provided with a stirrer; b is a gear pump; and c is a condenser of collecting a gas distilled from the first polycondensation reaction vessel a, and known condensers can be used, but the drawing shows a wet condenser as a representative example of the direct contact type condenser. d is a tank of the liquid collected in the wet condenser c; e is a pump; and f is a heat exchanger. g is a horizontal second polycondensation reaction vessel; h is a gear pump; i is a wet condenser of collecting a gas distilled from the second polycondensation reaction vessel; j is a tank of the collected liquid; k is a pump; m is a die for discharging the polymer; n is a chip cutter; and p is a heat exchanger.

Also, 1 is a feed line from an esterification reaction vessel or ester exchange reaction vessel (not shown) into the first polycondensation reaction vessel a; 2 is a feed line from the first polycondensation reaction vessel a into the second polycondensation reaction vessel g; 3 is a vent line from the first polycondensation reaction vessel a; 4 is a liquid discharge line from the wet condenser c; 5 is a circulation line from the tank d into the wet condenser c; 6 is a discharge line of a condensate into the outside; 7 is a feed line of 1,4-butanediol into the tank d; and 8 is a gas discharge line into an ejector A. On other hand, 10 is vent line from the second polycondensation reaction vessel g; 11 is a liquid discharge line from the wet condenser i; 12 is a circulation line from the tank j into the wet condenser i; 13 is a discharge line of a condensate into the outside; 14 is a feed line of 1,4-butanediol into the tank j; and 15 is a gas discharge line into an ejector G.

An oligomer fed from 1 is polycondensed in the first polycondensation reaction vessel a kept in vacuo and delivered into the second polycondensation reaction vessel g through 2. A vapor containing 1,4-butanediol, THF and water as the major components as generated in the first polycondensation reaction vessel a is delivered into the wet condenser c, and high-boiling 1,4-butanediol and trace amounts of THF and water are condensed herein and collected in the tank d. Using the pump e, a part of this liquid is discharged out the system through the line 6, and the remainder is circulated into the wet condenser c through 5 and used for condensation of 1,4-butanediol. Also, 1,4-butadiol is fed into the tank d from 7, if desired. On the other hand, a gas containing low-boiling THF and $H_2O$ as the major components is delivered into the ejector A through 8.

A prepolymer fed from 2 is further polycondensed in the second polycondensation reaction vessel g kept in vacuo, passed through the die head m from 9, and then pelletized in the chip cutter n. A vapor containing 1,4-butanediol, THF and water as the major components as generated in the second polycondensation reaction vessel g is delivered into the wet condenser i, and high-boiling 1,4-butanediol and trace amounts of THF and water are condensed herein and collected in the tank j. Using the pump k, a part of this liquid is discharged out the system through the line 13, and the remainder is circulated into the wet condenser i through 12 and used for condensation of 1,4-butanediol. Also, 1,4-butadiol is fed into the tank j from 14, if desired. On the other hand, a gas containing low-boiling THF and $H_2O$ as the major components is delivered into the ejector G through 15.

FIG. 3 shows a configuration of the deaeration system of the first polycondensation reaction vessel a and the second polycondensation reaction vessel g in FIG. 2. A, B, G, H and J are an ejector; C, D, K, L and M are a barometric condenser; E and N are a condenser; F and P are a vacuum pump; Q, R and S are a hot well tank; U is a buffer tank; W is a distillation separation column of THF and $H_2O$; X is a reboiler of the distillation separation column W; and T, V and Y are a pump.

Also, 8 in FIG. 3 is identical with 8 in FIG. 2 and stands for a distillation gas line from the first polycondensation reaction vessel a; similarly, 15 is identical with 15 in FIG. 2 and stands for a distillation gas line from the second polycondensation reaction vessel g; 16, 17, 26, 27 and 28 are each an ejection line of a gas from each barometric condenser; 18 and 29 are a line from the heat exchangers E and N into the vacuum pump F and P, respectively; 19 and 30 are an ejection gas line from the respective vacuum pump; and 20, 21, 31, 32 and 33 are a feed line of 1,4-butanediol, in which a part or the whole of the 1,4-butanediol is preferably constituted of circulation from the hot well tanks Q, R and S. Also, it is recommended to control the temperature of the subject liquid using the heat exchanger, etc. 22, 23, 34, 35 and 36 are a feed line of the 1,4-butanediol vapor into the ejector; 24, 25, 37, 38 and 39 are a barometric leg of each barometric condenser; 40 is a discharge line from the hot well tanks Q, R and S; 41 is a line from the pump T into the buffer tank U; 42 is a discharge line from the buffer tank U; 43 is a line from the pump V into the distillation separation column W; 44 is an expelling line into other system than the distillation separation column W, such as a starting material preparation system, or the outside; 45 is a discharge line of 1,4-butanediol from the distillation separation column W; 46 is a discharge line of a low-boiling component containing THF and $H_2O$ as the major components from the distillation separation column W; 47 is an ejection line of the pump Y; 48 is a feed line into the hot well tanks Q, R and S; 49 is a circulation line from the reboiler X; 50 is a feed line into a system other than the hot well tanks Q, R and S, such as a tank attached to the wet condenser attached to the polymerization reaction vessel (d and j in FIG. 2), a vapor generator of the ejector, a starting material system, external expelling tank, etc.; and 51 is feed line of 1,4-dutanediol from the outside.

The gas containing THF and $H_2O$ as the major components, which has been distilled from the first polycondensation reaction vessel a, is introduced into the first-stage ejector A via the line 8. At this time, the 1,4-butanediol vapor discharged from the ejector A is condensed in the barometric condenser C, and the condensate is collected in the hot well tank Q through the barometric leg 24. On the other hand, components that have not been condensed in the barometric condenser C are delivered into the second-stage ejector B through the line 16, and a condensate condensed in the barometric condenser D is collected in the hot well tank R through the barometric leg 25. Components that have not been condensed in the barometric condenser D are delivered into the condenser E through the line 17 and after condensing the components as far as possible, are finally discharged out the system using the vacuum pump F.

The gas distilled from the second polycondensation reaction vessel g is also delivered into the first-stage ejector G via the line 15, the 1,4-butanediol vapor discharged from the ejector G is condensed in the barometric condenser K, and the condensate is collected in the hot well tank S through the barometric leg 37. On the other hand, components that have not been condensed in the barometric condenser K are delivered into the second-stage ejector H through the line 26, and a condensate condensed in the barometric condenser L is collected in the hot well tank Q through the barometric leg 38. Components that have not been condensed in the barometric condenser L are delivered into the third-stage ejector J through the line 27, and a condensate condensed in the barometric condenser M is collected in the hot well tank R through the barometric leg 39. Components that have not been condensed in the barometric condenser M are delivered into the condenser N through the line 28 and after condensing the components as far as possible, are finally discharged out the system using the vacuum pump P.

The liquids containing 1,4-butanediol as the major component as collected in the hot well tanks Q, R and S are delivered into the buffer tank U through the line 40, and a part or the whole thereof is fed into the distillation separation column W through the pump V. At this time, a part or the whole of unpurified liquid can be used as the starting material or for expelling outside corresponding to the operation state (line 44).

The 1,4-butanediol from which low-boiling components such as THF and $H_2O$ have been separated in the distillation separation column W is discharged from the line 45, and a part or the whole thereof is returned into the hot well tanks Q, R and S through the line 48. At this time, Q, R and S are separated every operation pressure of the barometric condensers each connected thereto through the barometric leg, and the pressure order is S<Q<R.

In FIG. 3, the line for feeding 1,4-butanediol into all of the hot well tanks Q, R and S through 48 is shown. However, for example, according to the required operation condition, with respect to the hot well tank R into which the barometric leg of the condenser having a high operation pressure is inserted, it is possible to cover the feed of 1,4-butanediol having a low THF content by the condensate of the 1,4-butanediol vapor discharged from the ejectors B and J without direct feed through the line 48. Also, with respect to the THF separation from the hot well tank sealing liquid, needless to say, it is possible to undergo the THF separation in the hot well tank R that is assumed to have a relatively high THF concentration without doing it in, for example, the hot well tanks S and Q that are assumed to have a relatively low THF concentration.

Additionally, according to the operation state and economical state, it is possible to expel a part or the whole of the purified 1,4-butanedil into the starting material preparation system, the condenser, the ejector vapor generator, the outside, etc. (line 50). The low-boiling components such as THF as separated in the distillation separation column W are expelled outside through the line 46.

Here, needless to say, it is possible to properly change the form, number, etc. of the reaction vessel, the ejector, the tank, the pump, the distillation column, the condenser, the heat exchanger, and the like depending upon the performance, required quality, economical effect, etc.

Figure 4:
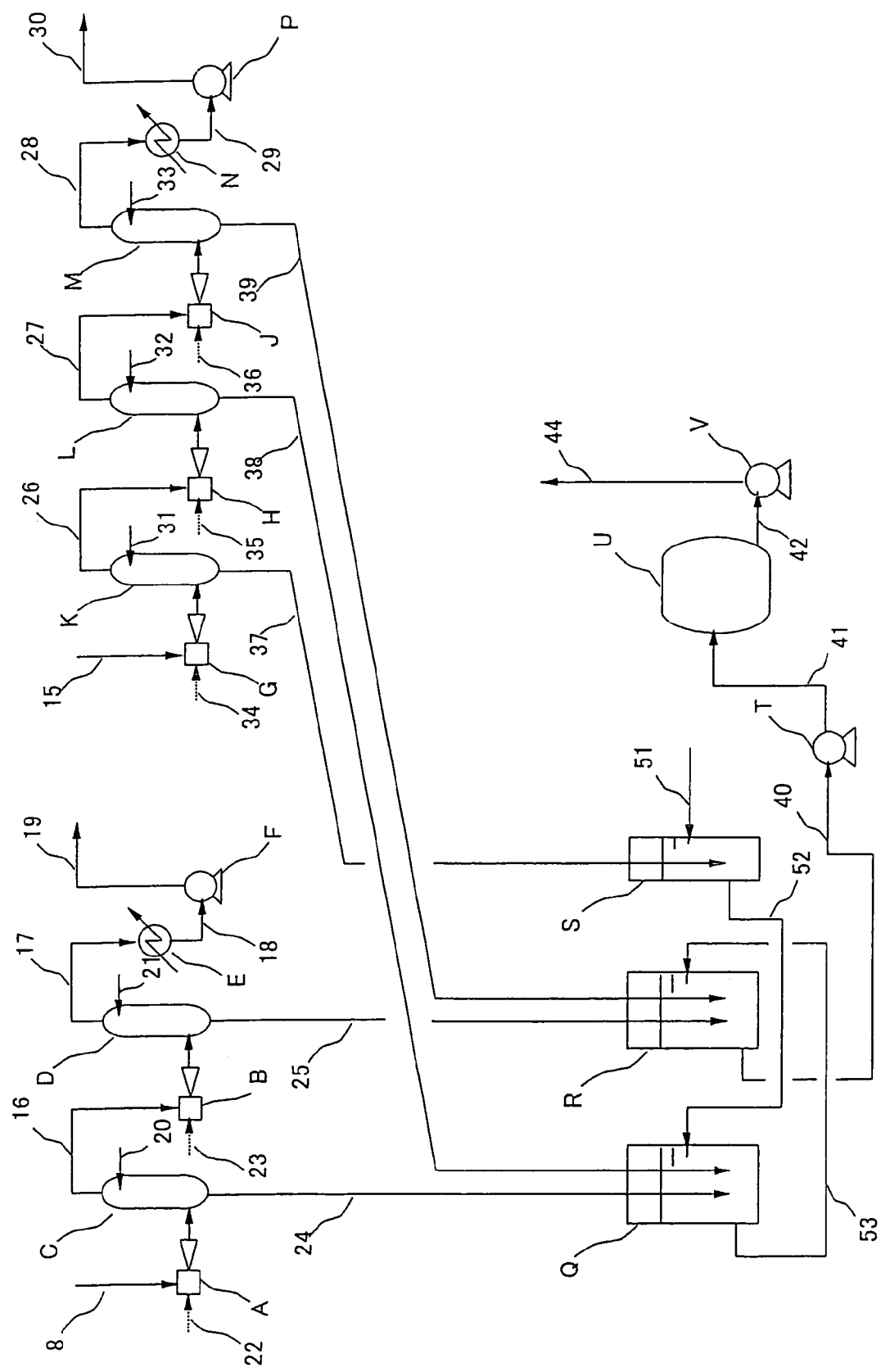
FIG. 4 is one conceptional view showing a deaeration system in detail in one embodiment of a polycondensation reaction apparatus to be used in the production process of the invention.

FIG. 4 shows an embodiment in which 1,4-butanediol having a low THF concentration is fed from the outside into the hot well tank S into which the barometric leg of the condenser having a low operation pressure is inserted through the line 51 and then fed into the hot well tanks Q and R into each of which the barometric leg of the condenser having a high operation pressure is inserted through the lines 52 and 53 in that order. In general, the critical backing pressure of the condenser becomes high in the order of S, Q and R, and it is possible to set the THF concentration of the hot well tank high in this order. Accordingly, when such a method is employed, it is possible to effectively utilize 1,4-butanediol to be fed into the hot well tank without waste.

Figure 5:
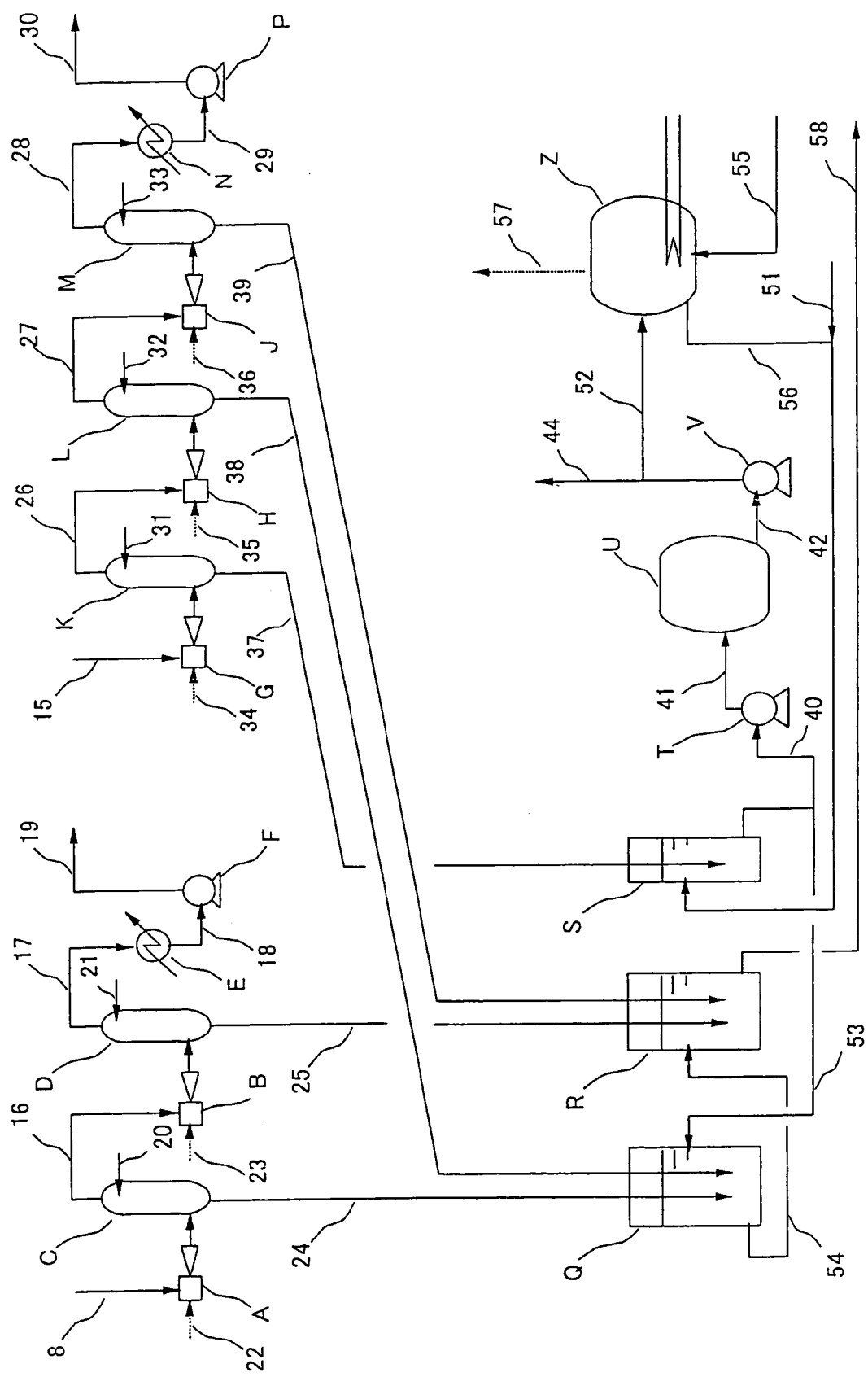
FIG. 5 is one conceptional view showing a deaeration system in detail in one embodiment of a polycondensation reaction apparatus to be used in the production process of the invention, which is an embodiment of feeding a part of a sealing liquid of a hot well tank S in FIG. 4 into a boiler Z for generation of a 1,4-butanediol vapor of an ejector.

FIG. 5 shows an embodiment in which a part of the sealing liquid of the hot well tank S in FIG. 4 is fed into the boiler Z for generation of the 1,4-butanediol vapor of the ejector. By employing such a method, it is possible to reduce the total amount of 1,4-butanediol to be used in the vacuum deaeration system shown in FIG. 5 and to change the production amount according to various demands.

EXAMPLES

The invention will be described below in more detail with reference to the following Examples, but it should not be construed that the invention is limited to these Examples.

Incidentally, in the Examples and Comparative Example, the evaluation was carried out in the following manners.

(1) THF Concentration in the Sealing Liquid of the Hot Well Tank:

The THF concentration was quantitatively determined by gas chromatography.

(2) Intrinsic Viscosity:

Using an Ubbelohde's viscosity and a mixed solution of phenol/tetrachloroethane (weight ratio: 1/1) as a solvent, the time required in seconds for falling was measured at 30° C. with respect to a polymer solution having a concentration of 1.0 g/dl and the solvent only, and the intrinsic viscosity was determined according to the following equation.

$$[\eta]=((1+4K_H\eta_{sp})^{0.5}-1)/(2K_HC)$$

In the equation, $\eta_{sp}=\eta/\eta_0-1$; $\eta$ represents a time required in seconds for falling of the polymer solution; $\eta_0$ represents a time required in seconds for falling of the solvent; C represents a polymer solution concentration (g/dl); and $K_H$ represents a Huggins constant. 0.33 was employed as $K_H$.

Example 1

In the flow chart of FIG. 2, 43 kg/h of a polybutylene terephthalate oligomer was continuously fed into the first polycondensation reaction vessel a through the line 1, to undergo polycondensation reaction while keeping an internal temperature, a pressure and a mean residence time in the first polycondensation reaction vessel at 235° C., 2.2 kPa and 1.6 hours, respectively, and a pre-polymer was fed into the second polycondensation reaction vessel g through the line 2. Polycondensation reaction was further undergone while keeping an internal temperature, a pressure and a mean residence time in the second polycondensation reaction vessel at 240° C., 0.2 kPa and 1.5 hours, respectively.

The pressures of the respective polycondensation reaction vessels were controlled using the vacuum system shown in FIG. 3 such that the initial pressures of the condensers C and D were 5 kPa and 15 kPa, respectively, and the pressures of the condensers K, L and M were 1.6 kPa, 5 kPa and 15 kPa, respectively.

At this time, the THF-containing 1,4-butanediol condensed in the hot well tanks Q, R and S was continuously discharged through 40 such that the liquid level of each of the hot well tank was constant, and THF was separated in the distillation separation column W. Thereafter, 1,4-butanediol having a THF concentration of not more than 0.05% by weight was fed at a rate of 15 kg/h into each the hot well tanks S and Q and at a rate of 10 kg/h into the hot well tank R through the line 48, and excessive 1,4-butanediol was discharged from the line 50.

Twelve hours after the start of the feed of the oligomer, the THF concentrations of the sealing liquids of the hot well tanks Q, R and S were 1.5% by weight, 2.8% by weight and 0.5% by weight, respectively, and the pressures of the first polycondensation reaction vessel a and the second polycondensation reaction vessel g were stable. At this time, the polymer (polybutylene terephthalate) ejected through the line 9 had an intrinsic viscosity of 0.85, and the THF concentrations in the sealing liquids of the hot well tanks Q, R and S and the intrinsic viscosity of the polymer were measured four times every 6 hours. As shown in Table 1, the THF concentrations of the hot well tanks Q, R and S were stable, and the intrinsic viscosity of the polymer was stable during a period of the operation.

Example 2

The same procedures as in Example 1 were followed, except that the feed of the purified 1,4-butanediol into the hot well tanks Q, R and S through the line 48 was stopped. At this time, an amount corresponding to the 1,4-butanediol fed from the ejectors and the condensate from the reaction system was discharged through the line 40 such that the liquid level of each hot well tank was constant.

Twelve hours after the start of the feed of the oligomer, the THF concentrations of the hot well tanks Q, R and S were 1.7% by weight, 5.1% by weight and 0.6% by weight, respectively, and 36 hours thereafter, the THF concentrations increased to 1.9% by weight, 5.3% by weight and 0.7% by weight, respectively. However, the pressure of each of the polycondensation reaction vessels was stable, and the intrinsic viscosity of the polymer was stable, too.

Example 3

Figure 6:
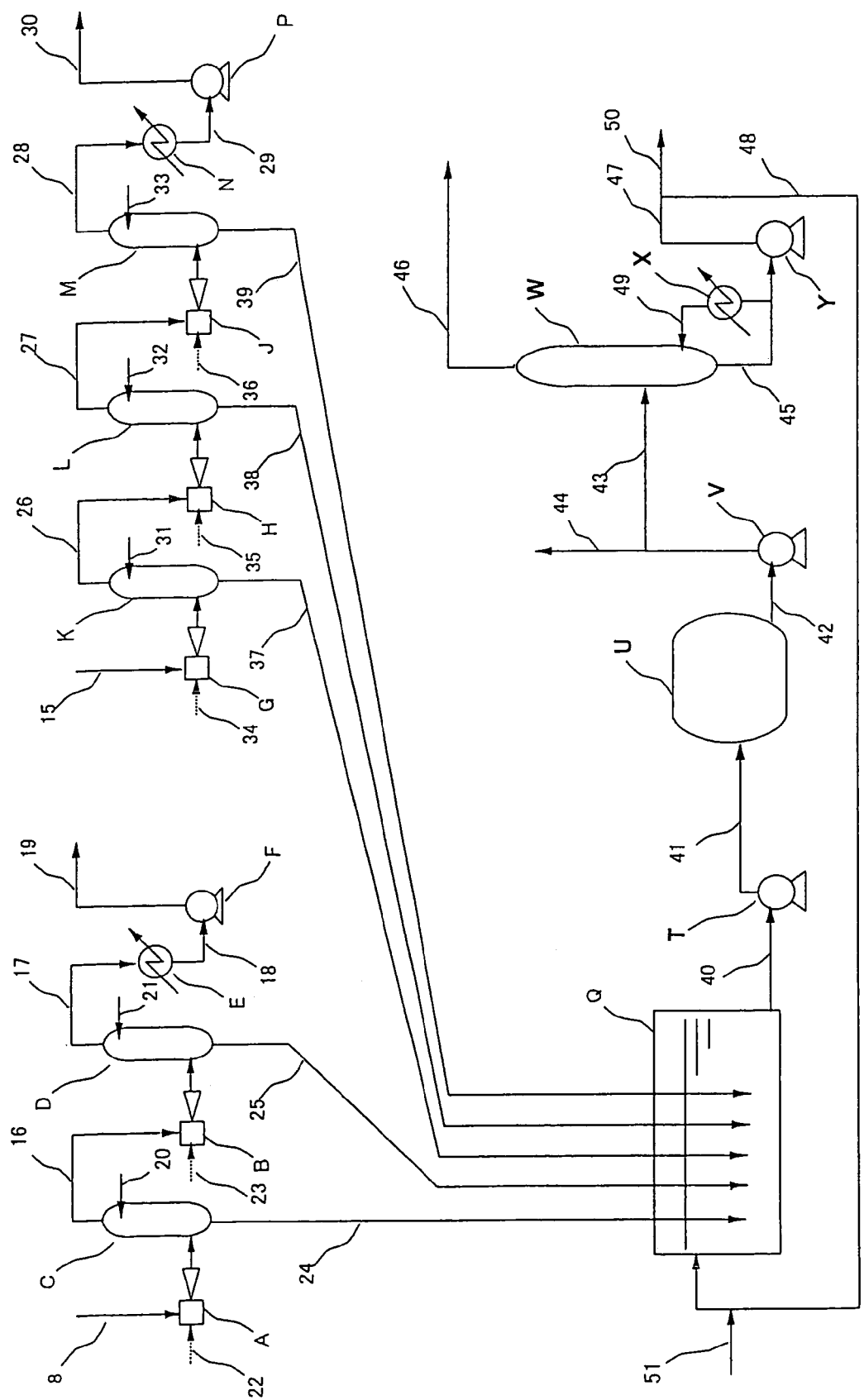
FIG. 6 is one conceptional view showing a deaeration system in detail in one specific embodiment of a polycondensation reaction apparatus to be used in the production process of the invention, which is employed in Example 3 and Comparative Example 1.

The same procedures as in Example 1 were followed, except for using a vacuum system comprising only the hot well tank Q as shown in FIG. 6. At this time, similar to Example 1, the THF-containing 1,4-butanediol collected in the hot well tank Q was continuously discharged through 40. After separating THF in the distillation separation column W, 40 kg/h of 1,4-butanediol having a THF concentration of not more than 0.05% was fed into the hot well tank Q through the line 48, and excessive 1,4-butanediol was discharged from the line 50.

Twelve hours after the start of the feed of the oligomer, the THF concentration of the sealing liquid of the hot well tank Q was 0.81% by weight, and the pressures of the first polycondensation reaction vessel a and the second polycondensation reaction vessel h were stable. At this time, the polymer (polybutylene terephthalate) ejected through the line 9 had an intrinsic viscosity of 0.85, the THF concentration in the sealing liquid of the hot well tank Q and the intrinsic viscosity of the polymer were measured four times every 6 hours. As shown in Table 1, the THF concentration of the hot well tank Q was stable, and the intrinsic viscosity of the polymer was stable during a period of the operation.

Comparative Example 1

The same procedures as in Example 3 were followed, except that the feed of the purified 1,4-butanediol into the hot well tank Q through the line 48 was stopped. At this time, an amount corresponding to the 1,4-butanediol fed from the ejectors and the condensate from the reaction system was discharged through the line 40.

Eighteen hours after the start of the feed of the oligomer, the THF concentration of the hot well tank Q was 4.9% by weight, and the ejector capacity became unstable. Corresponding to this, the pressures of the reactors increased, and 30 hours after the start of the feed of the oligomer, the pressure of the first polycondensation reaction vessel a was 6.5 kPa, and the pressure of the second polycondensation reaction vessel was 3.3 kPa.

As a result, as shown in Table 1, 12 hours after the start of the feed of the oligomer, the intrinsic viscosity of the polymer was 0.81, and 36 hours after the start of the feed of the oligomer, the intrinsic lowered to 0.45.

TABLE 1

|  |  |  | Time after the start of the feed of the oligomer (hr) | | | | |
| --- | --- | --- | --- | --- | --- | --- | --- |
|  |  |  | 12 | 18 | 24 | 30 | 36 |
| Example 1 | THF concentration | Hot well tank Q (% by weight) | 1.5 | 1.5 | 1.5 | 1.5 | 1.5 |
|  |  | Hot well tank R (% by weight) | 2.8 | 2.8 | 2.8 | 2.8 | 2.8 |
|  |  | Hot well tank S (% by weight) | 0.5 | 0.5 | 0.5 | 0.5 | 0.5 |
|  | Intrinsic viscosity of polymer |  | 0.85 | 0.85 | 0.85 | 0.85 | 0.85 |
| Example 2 | THF concentration | Hot well tank Q (% by weight) | 1.7 | 1.8 | 1.9 | 1.9 | 1.9 |
|  |  | Hot well tank R (% by weight) | 5.1 | 5.2 | 5.2 | 5.3 | 5.3 |
|  |  | Hot well tank S (% by weight) | 0.6 | 0.6 | 0.6 | 0.6 | 0.7 |
|  | Intrinsic viscosity of polymer |  | 0.85 | 0.85 | 0.85 | 0.85 | 0.85 |
| Example 3 | THF concentration | Hot well tank Q (% by weight) | 0.8 | 0.8 | 0.8 | 0.8 | 0.8 |
|  |  | Hot well tank R (% by weight) | — | — | — | — | — |
|  |  | Hot well tank S (% by weight) | — | — | — | — | — |
|  | Intrinsic viscosity of polymer |  | 0.85 | 0.85 | 0.85 | 0.85 | 0.85 |
| Comparative Example 1 | THF concentration | Hot well tank Q (% by weight) | 4.1 | 4.9 | 4.9 | 5.0 | 5.1 |
|  |  | Hot well tank R (% by weight) | — | — | — | — | — |
|  |  | Hot well tank S (% by weight) | — | — | — | — | — |
|  | Intrinsic viscosity of polymer |  | 0.81 | 0.67 | 0.55 | 0.47 | 0.45 |

While the invention has been described in detail and with reference to specific embodiments thereof, it will be apparent to one skilled in the art that various changes and modifications can be made therein without departing from the spirit and scope thereof.

This application is based on a Japanese patent application filed Sep. 20, 2002 (Japanese Patent Application No. 2002-275916) and a Japanese patent application filed Nov. 8, 2002 (Japanese Patent Application No. 2002-325705), the contents of which are incorporated herein by reference.

INDUSTRIAL APPLICABILITY

According to the invention, it is possible to provide a process of producing polyesters having a stable quality and a process of producing polyesters with a greatly reduced load against the environment.

The invention claimed is:

1. A process of producing polyesters having a stable intrinsic viscosity by using a polycondensation reaction apparatus having one or more polycondensation reaction vessels provided with one or more sets of an ejector, an upstream condenser placed between the polycondensation reaction vessel and the ejector, a condenser placed in the downstream portion of the ejector, a barometric leg, and one or more hot well tanks connected to the condenser via the barometric leg, wherein the upstream condenser is equipped with a collection tank for collecting a condensate obtained from condensing a vaporous composition obtained from the polycondensation reaction vessel, and including driving the ejector by a vapor composed mainly of 1,4-butanediol, condensing the vapor composed mainly of 1,4-butanediol as discharged from the ejector in the condenser placed in the downstream portion of the ejector, and making the reactor in a reduced pressure state to undergo polycondensation reaction, the process being characterized in that:

water contained in a sealing liquid in at least one hot well tank is maintained at a concentration of not more than 3% by weight; and tetrahydrofuran contained in a sealing liquid in at least one hot well tank is maintained at a concentration of not more than 4% by weight to thereby produce polyesters having a stable intrinsic viscosity.

2. The process of producing polyesters according to claim 1, wherein the polycondensation reaction apparatus has one or more polycondensation reaction vessels each provided with two or more sets of an ejector, a condenser placed in the downstream portion of the ejector, and a barometric leg and has two or more hot well tanks, the concentration of tetrahydrofuran contained in a sealing liquid in at least one hot well tank being not more than 4% by weight.

3. The process of producing polyesters according to claim 1, wherein the polycondensation reaction apparatus has two or more polycondensation reaction vessels each provided with one or more sets of an ejector, a condenser placed in the downstream portion of the ejector, and a barometric leg and has two or more hot well tanks, the concentration of tetrahydrofuran contained in a sealing liquid in at least one hot well tank being not more than 4% by weight.

4. The process of producing polyesters according to claim 1, wherein the polycondensation reaction apparatus has two or more polycondensation reaction vessels each provided with two or more sets of an ejector, a condenser placed in the downstream portion of the ejector, and a barometric leg and has two or more hot well tanks, the concentration of tetrahydrofuran contained in a sealing liquid in at least one hot well tank being not more than 4% by weight.

5. The process of producing polyesters according to claim 1, wherein a liquid having a tetrahydrofuran concentration of not more than 1% by weight is fed into at least one hot well tank, and the concentration of tetrahydrofuran contained in a sealing liquid in said hot well tank is adjusted at not more than 4% by weight.

6. The process of producing polyesters according to claim 5, wherein a sealing liquid in at least one hot well tank is discharged, tetrahydrofuran is separated and removed from a part or the whole of said liquid to obtain a liquid having a tetrahydrofuran concentration of not more than 1% by weight, and a part or the whole of said liquid is fed into at least one hot well tank.

7. The process of producing polyesters according to claim 1, wherein a sealing liquid in at least one hot well tank is discharged, a part or the wholes of said liquid is fed into a boiler for generation of a 1,4-butanediol vapor to form a 1,4butanediol vapor, and this 1,4-butanediol vapor is used as a vapor for ejector driving.

8. The process of producing polyesters according to claim 1, wherein the polyester is polybutylene terephthalate.

9. A process of producing a polyester having a stable intrinsic viscosity with a polycondensation reaction apparatus, wherein said polycondensation reaction apparatus comprises one or more polycondensation reactors each operating at a stable reduced pressure and independently equipped with, in successive order, one or more of each of the following: upstream condensers equipped with a collection tank for collecting a condensate obtained from condensing a vaporous composition obtained from the polycondensation reactor; vapor driven ejectors; downstream condensers; barometric legs; and hot well tanks comprising a sealing liquid obtained from said downstream condensers via said barometric legs, and wherein said process comprises:

driving said one or more vapor driven ejectors with a vapor predominantly comprising 1,4-butanediol;

maintaining a water concentration of not more than 3 wt. % within said sealing liquid of at least one of said one or more hot well tanks; and maintaining a tetrahydrofuran concentration of less than or equal to 4 wt. % within said sealing liquid of at least one of said one or more hot well tanks to thereby produce polyesters having a stable intrinsic viscosity.

10. The process of producing a polyester according to claim 9, wherein said one or more polycondensation reactors are each independently further equipped with, downstream of said one or more hot well tanks comprising said sealing liquid, one or more distillation columns producing a 1,4-butanediol distillate, and wherein said process further comprises feeding said 1,4-butanediol distillate, which comprises tetrahydrofuran at a concentration of less than or equal to 2 wt. %, obtained from said one or more distillation columns into at least one of said one or more hot well tanks, thereby maintaining a tetrahydrofuran concentration of less than or equal to 4 wt. % within said sealing liquid of at least one of said one or more hot well tanks.

11. The process of producing a polyester according to claim 9, wherein said one or more polycondensation reactors are each independently further equipped with, downstream of said one or more hot well tanks comprising said sealing liquid, one or more boilers, wherein said process further comprises feeding said sealing liquid of at least one of said hot well tanks into said one or more boilers thereby generating a 1,4-butanediol vapor for driving said one or more vapor driven ejectors.

12. The process of producing a polyester according to claim 9, wherein said stable reduced pressure is less than or equal to 27 kPa.

13. The process of producing a polyester according to claim 9, wherein each of said one or more downstream condensers have an identical or different pressure of from 1.6 kPa to 15 kPa.

14. The process of producing a polyester according to claim 10, wherein said 1,4-butanediol distillate comprises tetrahydrofuran at a concentration of less than or equal to 1 wt. %.

15. The process of producing a polyester according to claim 9, wherein said sealing liquid within at least one of said hot well tanks comprises tetrahydrofuran maintained at a concentration of less than or equal to 3 wt. %.

16. The process of producing a polyester according to claim 9, wherein said sealing liquid within at least one of said hot well tanks comprises tetrahydrofuran maintained at a concentration of less than or equal to 1.5 wt. %.

17. The process of producing a polyester according to claim 9, wherein said sealing liquid within at least one of said hot well tanks comprises tetrahydrofuran maintained at a concentration of less than or equal to 1 wt. %.

18. The process of producing a polyester according to claim 9, wherein said polyester comprises a dicarboxylic acid unit selected from an aromatic dicarboxylic acid unit, an alicyclic dicarboxylic acid unit, and an aliphatic dicarboxylic acid unit, wherein said aromatic dicarboxylic acid unit is selected from the group consisting of terephthalic acid, isophthalic acid, 4,4'-diphenyldicarboxylic acid, 4,4'-diphenyl ether dicarboxylic acid, 4,4'-benzophenonedicarboxylic acid, 4,4'-diphenoxyethanedicarboxylic acid, 4,4'-diphenylsulfonedicarboxylic acid, and 2,6-naphthalenedicarboxylic acid, wherein said alicyclic dicarboxylic acid unit is selected from the group consisting of 1,2-cyclohexanedicarboxylic acid, 1,3-cyclohexanedicarboxylic acid, and 1,4- cyclohexanedicarboxylic acid, and wherein said aliphatic dicarboxylic acid unit is selected from the group consisting of malonic acid, succinic acid, glutaric acid, adipic acid, pimelic acid, suberic acid, azelaic acid, and sebacic acid.

19. The process of producing a polyester according to claim 9, wherein said polyester comprises a 1,4-butanediol unit.

20. The process of producing a polyester according to claim 9, wherein said polyester comprises a 1,4-butanediol unit, and a dicarboxylic acid unit selected from the group consisting of terephthalic acid, isophthalic acid, succinic acid, and adipic acid.

* * * * *